Patented Nov. 11, 1947

2,430,535

UNITED STATES PATENT OFFICE 2,430,535

VEGETABLE PRODUCTS AND PROCESS OF PRODUCING THE SAME

Edward W. Schmidt, St. Paul, and William F. Webber, Minneapolis, Minn., assignors to Archer-Daniels-Midland Company, Minneapolis, Minn., a corporation of Delaware No Drawing. Application June 25, 1945, Serial No. 601,550

12 Claims. (Cl. 260—412.4)

This invention relates to improved methods of extracting vegetable oils from high oil content seeds and nuts and to the products resulting therefrom. The invention relates particularly to a new process for extracting linseed oil from the seed and to the resultant products.

Linseed oil has been produced from flax for nearly one hundred years by mechanical methods involving high pressure squeezing of ground flax seed for pressing of the oil therefrom. The flax seed is first cooked and the moisture content is adjusted by adding or removing moisture to a level satisfactory for the mechanical pressing operations. Where the extraction is carried out in the old style hydraulic presses, the seed is milled, usually on smooth roll mills so as to rupture the seeds, and the resultant flax seed meal is pressed under heavy pressure. More lately the mechanical extraction of the oil from the seed has been accomplished in a mechanical screw press in order to expel the oil from the seeds. In this method the seed is milled on smooth rolls, cooked, dried, and the oil removed by screw pressing, the screw press being so constructed as to produce a requisite high pressure for obtaining the oil from the resultant fractured and prepared seed.

These mechanical methods of recovering the oil from flax when operated under most favorable conditions are able to reduce the oil content of the resultant linseed meal or cake to 3.5% at a minimum. The more usual, less efficient extraction yields a cake or meal having a higher oil content. Good commercial operations of mechanical screw press mills average more nearly 4% to 4.5% oil content in the cake.

The extraction of other oil-containing seeds or nuts, for example soybeans, has been accomplished by a solvent method, and a much lower final oil content, viz., .75% to 1.25%, is obtained in the resultant meal or cake. For the extraction of, for instance, soybeans, the beans are first ground into small grits which are then heated and steamed and sent through smooth rolls so as to flake the grits into very thin flakes. The flakes are then solvent extracted utilizing any suitable solvent-extracting apparatus, for example, a movable bucket type extractor. The soybean grits resulting from the grinding operation do not in themselves extract readily because the solvent does not penetrate into the grits and remove the oil therefrom.

In order to obtain a reasonably good penetration of solvent in the soybean extraction process, the grits are reduced to thin sections by a "flaking" process in which the grits are rendered plastic by controlled heat and moisture conditions and then simply rolled into exceedingly thin flakes having a thickness of about .006" to .015" through which the solvent can readily penetrate and thereby extract the oil.

Attempts have heretofore been made to utilize mechanical and solvent processes for extracting the oil from high oil content seeds such as linseed, babassu and palm kernel nut meats, copra, cottonseed, sesame, peanuts, and the like, all of which have an oil content in excess of 25%, but exceedingly great difficulties have been encountered as a result of the following circumstances:

When, for instance, linseed is treated as in the soybean extracting process to solvent extract the oil therefrom, the seed may be ground and flaked, but the flakes are very fragile and during any subsequent handling and during the ensuing solvent extraction there is developed a large quantity of "fines" of minute size which not only cause difficulty in the drainage of solvent from the linseed mass but also carry over into the resultant fluid mixture of solvent and oil from which the "fines" must be recovered. In the solvent extraction process the solvent, usually hexane, must be recovered from the vegetable seed residue undergoing extraction and when the soybean method of solvent extraction is applied to linseed it has been found that the "fines" developed, as described above, carry over with the vaporized hexane and the steam used for such vaporization and solvent recovery. When the fines produced are small in quantity, as for example in the solvent extraction of flaked soybeans, they can be removed by dust collectors or dust washers located ahead of the condensers. However, the larger quantity of "fines" that develop when the soybean method is applied to linseed prevents the collectors or washers from operating in a satisfactory manner. The "fines" carry along and precipitate or settle in the condenser used for condensing the hexane and steam. As a result they clog the condenser, and the operation very frequently has to be shut down. No satisfactory solution of the "fines" problem in the solvent extraction of high oil content seeds or nuts, was available to the art prior to the present invention.

It is an object of the invention to provide a process for the combined mechanical and solvent extraction of high oil content vegetable seed or nut materials wherein the oil content of the seed or nut starting material exceeds 25%.

It is also an object of the present invention to provide an improved process of extracting the oil from linseed involving mechanical extraction of a first portion of the oil together with a solvent extraction of the remainder of the oil, and wherein the development of "fines" is completely obviated. It is also an object of the invention to provide an improved linseed product of prescribed particle size containing a portion of the natural oil content of the seed. It is a further object of the invention to provide improved oil-extracted, granulated linseed products substantially free from dust, and containing not more than a fractional percentage of linseed oil. It is a further object of the invention to provide linseed flour products high in protein and carbohydrates, free from all but a fractional percentage of oil, dry, granular, free from dust and hull material, of light cream color. It is a further object of the invention to produce a relatively dust-free linseed meal of low oil content having a low weight per bushel, as compared with prior art linseed meal.

Other and further objects of the invention are those inherent in the process herein described and claimed.

In general, in carrying out the invention there is utilized the whole, high oil content seed or nut material which is then treated by passage through a mechanical screw press for the extraction of a portion of the oil therefrom so as to reduce the oil content to 10% to 24%, preferably 12% to 20%. The screw pressing operation is adjusted so as to produce a fracture of the high oil content seed or nut material with just enough compresion and working so as to effect a partial reduction of the oil content to the range of 10% to 24%, preferably 12% to 20%, avoiding pressing the cake into a tight, compact mass of low porosity. In the screw pressing operation there is believed to be a laceration and disruption of most of the oil cells. The thickness of the resulting cake may be varied within wide limits, thus from $\frac{1}{32}$ of an inch to $\frac{1}{4}$ inch, $\frac{1}{16}$ inch cake being usually most satisfactory. The water content of the incoming raw seed or nut material is usually satisfactory as received, although some adjustment of the water content may be made in order to obtain the requisite oil content reduction during the mechanical screw press oil-expelling operation. The press cake thus produced is hereinafter designated in the specification and claims as a "soft, porous press cake having an oil content of 10% to 24%," the preferred oil content range of such cake being 12% to 20%.

The resultant soft, porous press cake from the mechanical screw press is reduced to granules by utilizing, for example, a corrugated roller mill of the type customarily used in the roller milling of wheat flour. When using such a roller mill for granulating the soft, porous press cake of the present invention, the roller mill rolls have corrugations of from 8 to 22 per inch, and the cake is gradually reduced in multiple stages with removal of the .012–.066 inch material after each reduction by utilizing sifting and/or screening or size-classifying equipment. Any other suitable method for granulating and sizing the soft, porous press cake may be used which is capable of producing a granulated product from the cake, in which not more than 10% of the particles are smaller than .012 inch in size. A hammer mill or attrition mill with suitable screening equipment may be used, but they tend to produce a larger proportion of the undesirable small size granular material under .012 inch in size, and a corrugated roll mill is therefore preferred. Concerning the upper size limit, it is possible to have 5% or more of particles greater than .066 inch, provided such particles are hulls or chiefly hulls. The multiple-break roller mills with intermediate screening equipment is the preferred means of reducing the cake to granular sizes within this range.

In treating flax seed, specifically, for the removal of oil and for the production of improved flax products in accordance with the present invention, there is utilized commercial whole flax. The whole seed is preliminarily pressed on a mechanical screw press, the conditions of the press being so regulated as to produce a soft, porous linseed press cake with just enough compression to reduce the oil content to 10% to 24%, and without pressing the cake into a tight compact mass of low porosity. The screw pressing operation reduces the oil content to 10% to 24%, preferably 12% to 20%. It is unsatisfactory to work the flax in the mechanical screw press prior to solvent extraction so as to obtain an oil reduction below 10% since an oil content of the cake much below this figure is hard and compact and of so low a porosity as to retard solvent penetration and therefore can not be solvent extracted efficiently. The upper oil limit is determined by the ability to classify the granulated material during milling. Where too much oil remains in the cake leaving the mechanical screw press, the granulated material does not classify well after granulation. Therefore, the mechanical screw press is adjusted so as to obtain material which is easily classified as to size of granules after granulation.

The reduction of the screw press flax seed cake to granules can be accomplished on corrugated rolls having corrugations from 8 to 22 per inch. For best results the reduction is accomplished in two or more stages utilizing an intermediate sifting or screening operation so as to separate out the material having a size of .012 to .066 inch between each roll reduction. For best results the intermediate screening may be adjusted so as to screen out the material having a size of .017 to .054 between each roll reduction. The resultant composite granulated material leaving the corrugated rolls and screening equipment should not contain more than 10% by weight of particles having a size less than about .012 inch. This smaller size granulated material resulting from the corrugating and sifting is collected into one stream and is fed into the composite granulated mass in controlled quantities for regulating the rate of solvent drainage in the subsequent solvent-extracting phase of the operation, as hereinafter described. Any excess of these small size granules (under .012 inch) is returned to the incoming whole flax entering the mechanical screw press where it is blended into the resultant soft, porous press cake. The composite granulated material leaving the corrugating rolls and sifters may thus be defined as soft and porous and not excessively compressed so as to be of low porosity. The granular size of the material is adjusted so that the major part of the granular mass, by weight, viz., 85-90% is of a granular size greater than .012 inch but not greater than .066 inch. The mass may contain a minor percentage, viz., up to about 10% of small granular particles of less than .012 inch size and may also contain a fractional percentage, viz, not substantially greater than 5%, of particles having a size larger than .066 inch. It may be stated, incidentally, that the larger size particles usually consist of the hulls of the seed which are tough and defy disintegration in the screw pressing and rolling operations. The granular mass material has a weight of from about 30 to 40 pounds per bushel, the weight being preferably kept in the range of about 32 to 38 pounds per bushel. The oil content of the granulated material is kept within 10% to 24%, preferably 12% to 20%.

The granulated flax seed material from which the oil has thus been partially removed in the mechanical screw pressing operation, is then solvent extracted utilizing any suitable type of extraction equipment, for example a movable bucket type. The solvent extraction is usually accomplished by the hydrocarbon hexane. Proper drainage and penetration of the solvent through the material undergoing extraction is a requisite for any efficient extracting operation. In the usual bucket-type extracting apparatus the buckets are from 23 to 24 inches deep and have curved sides. The granulated linseed material undergoing extraction is fed into the buckets to a depth such that about 12 inches of space is allowed above the material to the edge of the bucket. The buckets themselves have a bottom composed of 40 mesh screen and the solvent from one bucket drips through onto the next lower bucket. For efficient extraction a head of solvent must be maintained over the granulated material undergoing extraction, the preferred head being not less than four inches deep in each bucket and must not overflow. Where drainage through the granulated press cake is too rapid some of the smaller size granulated material, heretofore referred to, is fed into the granulated mass and serves to restrict the drainage, thereby permitting the solvent to build up to the desired level above the granulated mass. This permits regulation of the rate of drainage to allow sufficient time of contact of the solvent with each particle and insure penetration of the solvent throughout the entire mass, thus insuring efficient extraction of the oil. The solvent-oil mixture leaves the extractor and the solvent and oil are separated by usual procedures.

The rate of solvent drainage may easily be adjusted to any desired rate ranging from 2 or 3 gallons/minute/square foot of area/foot of depth of material up to as much as 25-30 gallons/minute/square foot/foot of depth of material. A controlled rate of solvent drainage in the range of 4 to 6 gallons/minute/square foot of area/foot of depth of material may easily be achieved, regulation within this range being accomplished by adding the small size granulated material (viz, .012 inch or less) in controlled amounts to the granular material of particle size in the range of .012 inch to .066 inch. It may be noted parenthetically that the solvent drainage rate in usual soybean solvent-extraction process equipment is about 4.5 gallons/minute/square foot of area/foot of depth of material. It is a feature of this invention that the drainage rate has been maintained at a satisfactorily high rate by regulated selection of particle size while yet maintaining adequate solvent penetration and extraction by utilization of a relatively soft and porous granule structure. A reduction of the oil content of the granulated linseed mass to less than 1%, usually about ½% oil content, is readily achieved.

The removal of the solvent from the solvent-oil mixture ("miscella") and from the residue of the granulated flax seed material is accomplished by heating. In each instance, steam may be used so as completely to evaporate the solvent. By utilizing a granulated material of the size, bulk (weight per bushel) and oil content and prepared as hereinbefore stated, there is substantially no development or carry-off of "fines" with the solvent-oil ("miscella"), nor is there any appreciable development or carry-over of "fines" with the steam and solvent leaving the granulated mass, and as a result continued operation of the solvent recovery apparatus is achieved without difficulty. Continued operation of the hexane recovery condenser for long periods of time, equalling or greater than in present-day commercial soybean plants, is therefore possible due to the minimizing of deposition of "fines" in the condenser of the solvent recovery apparatus. This forms a distinct improvement over any process heretofore available.

The resultant meal leaving the solvent-extracting apparatus when freed from hexane, is remarkably free from dust. It contains less than 1½, usually less than 1%, ether extractable materials (when using sulfuric ether). The ether extractable material is principally fat and such residual extractables are usually known as the "fat" content. It is granular in appearance and has a weight of about 31 to 35 pounds per bushel. In general the solvent extraction causes some reduction in size of the particles making up the meal, without however causing them to lose their granular character. The screen analysis of the substantially fat-free, dust-free meal of representative operation is generally as follows: Substantially none larger than .065"; about 10-16% in the size range from .065" to .0328"; about 40-50% in the size range of from from .0328" to .0164"; about 30-40% in the size range from .0164" to .0097"; about 3-8% in the size range from .0097" to .0069"; about 1-4% in the size range from .0069" to .0058"; and about 2% maximum in the size range below .0058".

The meal leaving the hexane driers may be fractionated by screening so as to separate a low-fat linseed "flour," a product not heretofore available. The fraction of particles of this material capable of passing through a 100 mesh screen (.0058 inch opening) is greyish-cream in color and contains a substantial proportion of linseed protein and carbohydrate. It is bland in flavor, edible and highly nutritious. This fraction constitutes about 1% to 1.5% of the unground hexane-free meal leaving the driers, but by suitable milling and sifting of the unground hexane-free meal leaving the driers, this greyish-cream fraction may be increased to 80-85%, the remainder being the hulls which are separated out. Such milling and screening may be carried out in apparatus analogous to that used in wheat flour milling.

By way of further illustration of the invention but without any limitation thereon, reference is made to the following examples:

*Example I*

The present example was carried out in a soybean solvent extraction mill of 500 tons per day capacity.

Commercial whole flax of No. 1 grade having a moisture content of about 7% was treated in a mechanical screw press the press being so regulated as to produce a soft, porous press cake with just enough compression so as to just barely form a cake. The oil was only partly expelled and the porosity of the resultant cake was not destroyed. A cake of 1/8 inch thickness was produced, the screw press being operated at full feed, and the resultant cake had an oil content of 14.25%. The cake produced by the mechanical screw press was then reduced on corrugated rolls 9 inches in diameter and 30 inches long running at a differential in speed of 1.5 to 1. In the first break the corrugations were 8 per inch on the fast roll and 10 per inch on the slow roll and having a spiral of 1/4 inch per foot. The rolls were run "sharp to sharp," although it may be stated parenthetically that operation of the rolls "sharp to dull" produces a reasonably good result. The granulated material leaving the first break was sent over a first sifter comprising a two-surface screen. The material over .054 was sent to the second break. The material through a .054 inch and over .017 inch was sent to the solvent-extracting apparatus, hereinafter defined. The small size granulated material passing through a .017 inch opening was set aside and was returned to the mechanical screw press or fed into the composite granulated mass, as hereinafter described.

The second break was composed of two rolls 9 inches in diameter and 30 inches long running at a differential of 1.5 to 1. On the fast roll the corrugations were 12 per inch and on the slow roll, 14 per inch, the corrugations in each instance having a spiral of 1/4 inch per foot. The rolls were run "sharp to sharp" but may with reasonably good results be run "sharp to dull." The material leaving the second break was sent over a second sifter comprising a two-surface screen. The material over .054 inch in size was sent to the third break. The material passing through a .054 inch opening screen and collected on a .017 inch opening screen was sent to the solvent extractor, hereinafter described. The small size granulated material passing through a .017 inch opening screen was set aside and either returned to the mechanical screw press or fed into the composite granulated material, as hereinafter described.

The third break consisted of a pair of corrugated rolls 9 inches in diameter and 30 inches long running at a differential in speed of 1.5 to 1. On the fast roll the corrugations were 18 per inch and on the slow roll 20 per inch, the corrugations having a spiral of 1/4 inch per foot. The material leaving the third break was sent through a third sifter comprising a single-surface screen. The material which failed to pass through a screen having .017 inch openings was sent to the solvent extractor, as hereinafter described and the small size granulated material was returned to the mechanical screw press or fed into the composite mass, as heretofore stated.

Generally speaking, the small size granulated material resulting from each sifting and screening operation is collected together and none, all or any proportion of this small size material may be diverted in regulated amounts to the stream of the composite granulated material of a size ranging from .017 inch to .054 inch, entering the solvent extractor so as to produce the requisite drainage rate in the solvent-extracting apparatus. In this example approximately half of the small size granulated material was thus so mixed. The residue of this small size material was returned to the inlet of the screw press.

The particle size entering the solvent extractor had the following size composition:

| Tyler Standard Screen Scale Sieves Screen Size, Meshes Per Inch | Opening Size, Inches | Per cent, By Weight |
|---|---|---|
| Over 14 | .054 | 1.5 |
| Thru 14 | .054 | 8.8 |
| Over 16 | .0465 | |
| Thru 16 | .0465 | 5.8 |
| Over 18 | .0406 | |
| Thru 18 | .0406 | 19.9 |
| Over 20 | .0360 | |
| Thru 20 | .0360 | 50.4 |
| Over 40 | .0170 | |
| Thru 40 | .0170 | 8.2 |
| Over 50 | .0125 | |
| 1/2 of small size Thru 50 [1] | .0125 | 4.8 |

[1] Only 1/2 of the small size granulated material capable of passing through a 50-mesh screen were blended into the material entering the solvent extraction apparatus, the remainder being returned to the mechanical screw press.

The material entering the extractor had a weight of about 35.17 pounds per bushel and an oil content of 14.21%. The solvent extraction was carried out in a movable bucket type extractor utilizing hexane as the solvent material. The solvent was added as in standard soybean solvent extraction, and efficient extraction and proper drainage was obtained. The buckets were 23–24 inches deep having bowl-shaped sides, the granulated flax seed material being fed into the buckets until it reached a depth of 12 inches from the bottom. The rate of drainage of the solvent through the material in the buckets was 4.5 gallons/minute/square foot of granulated material/foot of depth. The amount of small granulated material (thru 50 mesh) that was added was varied slightly from time to time so as to achieve such a drainage rate as indicated by the maintenance of a head of solvent of 4 to 6 inches over the granulated material in the bucket.

The solvent was removed from the granulated material utilizing steam in accordance with the usual practice. No difficulty whatever was encountered due to the development of "fines" in the extracted granular material nor was there any depositions of "fines" material in the condenser of the solvent recovery apparatus handling the solvent-steam flow from the extracted granulated material. Or otherwise stated, no "dust trouble" was developed in the condensers. Likewise, the solvent-oil mixture (miscella) leaving the extraction tower was essentially free from "fines" to such an extent that no difficulty was encountered in filtering the miscella prior to removal of the solvent.

The dried, substantially dust-free granulated material has a high food value and may be sold as cattle feed. The dry granulated meal leaving the solvent-extracting apparatus had a size analysis as follows:

| Tyler Standard Screen Scale Sieves Screen Size | Screen Opening Size | Fraction |
|---|---|---|
| | | Per cent |
| Over 10 | .065 | 0 |
| Thru 10 | .065 | |
| Over 20 | .0328 | 12.9 |
| Thru 20 | .0328 | |
| Over 40 | .0164 | 44.3 |
| Thru 40 | .0164 | |
| Over 60 | .0097 | 34.4 |
| Thru 60 | .0097 | |
| Over 80 | .0069 | 5.1 |
| Thru 80 | .0069 | |
| Over 100 | .0058 | 2.1 |
| Thru 100 | .0058 | 1.2 |

The dry granulated material contained approximately 0.75% oil; it bulked at 32.5 pounds per bushel. The granules passing through a 100 mesh screen may readily be sifted from the meal and are substantially free from any hulls. This fraction constitutes about 1.2% of the oil-free meal leaving the hexane driers and is light cream, has a bland flavor and is highly nutritious. The amount of material capable of passing through a 100 mesh screen can be increased up to 80–85% by grinding and screening.

*Example II*

Commercial sesame seed having a moisture content of about 5% was treated on a mechanical screw press as in Example I, the press being regulated so as to produce a soft, porous press cake with just enough compression so as to just barely form a cake. The oil was only partly expelled and the porosity of the resultant cake was not destroyed. The oil content of the original seed was reduced from 52.86% in the raw seed to 22.74% in the scalped cake. The cake was about ⅛ inch thick. The cake so produced was granulated and classified as to size using three stages of reduction with corrugated rolls and intermediate screens as in Example I. None of the granules was larger than .054 inch and only a small percentage was smaller than .0163 inch. The small size granules were separated and then fed back in varying amounts for regulating the rate of drainage as explained in Example I.

The sized and granulated material ready to enter the extractor had the following size analysis:

| Tyler Standard Screen Scale Sieves Screen Size, Meshes Per Inch | Opening Size, Inches | Per cent, By Weight |
| --- | --- | --- |
| Over 14 | .054 | 0.0 |
| Thru 14 | .054 | 4.5 |
| Over 16 | .0465 | |
| Thru 16 | .0465 | 8.0 |
| Over 18 | .0406 | |
| Thru 18 | .0406 | 9.5 |
| Over 20 | .0360 | |
| Thru 20 | .0360 | 69.4 |
| Over 48 | .0163 | |
| Thru 48 | .0163 | 8.6 |
| Over 60 | .0127 | |
| Thru 60 | .0127 | 0.0 |

The Tyler scale screen sizes used in making the size analysis in this Example and Example III were made of slightly different wire on the small size end and the openings of .017 inch were therefore slightly less (i. e., to .0163 inch) and the opening of .0125 inch slightly larger (i. e., to .0127 inch). For all practical purposes this makes no difference in the analysis but the point is noted for purposes or accuracy.

The sized and granulated material ready to enter the extractor had a weight of 39.8 pounds per bushel and an oil content of 22.74%.

Solvent extraction was accomplished using hexane as a solvent, and efficient extraction and proper drainage was obtained. The rate of drainage of the solvent through the material was 6.19 gallons/minute/square foot of granulated material/foot of depth. This drainage rate was somewhat more rapid than in commercial soybean extraction equipment and where it is desired to reduce the rate of drainage this can easily be accomplished by mixing into the sized and granulated material (of a size of .0163 inch to .054 inch), a small amount of small granulated material under .0163 inch. In this way the desired drainage rate and head of solvent could be regulated as hereinbefore described.

The solvent was removed from the granulated material utilizing steam in accordance with the usual practice. No difficulty whatever was encountered due to the development of "fines" in the extracted granular material nor was there any depositions of "fines" material in the condenser of the solvent recovery apparatus handling the solvent-steam flow from the extracted granulated material. Or otherwise stated, no "dust trouble" was developed in the condensers. Likewise, the solvent-oil mixture (miscella) leaving the extraction tower was essentially free from "fines" to such an extent that no difficulty was encountered in filtering the miscella prior to removal of the solvent.

The dried, substantially dust-free granulated material (meal) had an oil content of about 0.9%.

*Example III*

Commercial babassu nuts having a moisture content of about 6% were treated on a mechanical screw press as in Examples I and II, the press being regulated so as partially to expel the oil. The cake was friable and could easily be fractured and crumbled in the hands; it was porous but slightly more firm than in Example I. The oil content of the original babassu nut material was reduced from 64.9% in the raw babassu nuts to 18.84% in the scalped cake. The cake was about ⅜ inch thick. The cake so produced was granulated and classified as to size using three stages of reduction with corrugated rolls and intermediate screens as in Example I. The major portion of the granules were larger than .0163 inch and smaller than .054 inch. The small size granules under .0163 inch were separated and then fed back in regulated amounts for regulating the rate of drainage as explained in Example I.

The sized and granulated material ready to enter the extractor had the following size analysis:

| Tyler Standard Screen Scale Sieves Screen Size, Meshes Per Inch | Opening Size, Inches | Per cent, By Weight |
| --- | --- | --- |
| Over 14 | .054 | 0.0 |
| Thru 14 | .054 | 16.0 |
| Over 16 | .0465 | |
| Thru 16 | .0465 | 15.0 |
| Over 18 | .0406 | |
| Thru 18 | .0406 | 13.0 |
| Over 20 | .0360 | |
| Thru 20 | .0360 | 53.0 |
| Over 48 | .0163 | |
| Thru 48 | .0163 | 3.0 |
| Over 60 | .0127 | |
| Thru 60 | .0127 | 0.0 |

The sized and granulated material ready to enter the extractor had a weight of 43.5 pounds per bushel and an oil content of 18.84%.

Solvent extraction was accomplished using hexane as a solvent, and efficient extraction and proper drainage was obtained. The rate of drainage of the solvent through the material was 13.33 gallons/minute/square foot of granulated material/foot of depth. This drainage rate was somewhat more rapid than in commercial soybean extraction equipment and where it is desired to reduce the rate of drainage this can easily be accomplished by mixing into the sized and granulated material (of a size of .0163 inch to .054), a small amount of small granulated material under .0163 inch. In this way the desired drainage rate and head of solvent could be regulated as hereinbefore described.

The solvent was removed from the granulated material utilizing steam in accordance with the usual practice. No difficulty whatever was encountered due to the development of "fines" in the extracted granular material nor was there any depositions of "fines" material in the condenser of the solvent recovery apparatus handling the solvent-steam flow from the extracted granulated material. Or otherwise stated, no "dust trouble" was developed in the condensers. Likewise, the solvent-oil mixture (miscella) leaving the extraction tower was essentially free from "fines" to such an extent that no difficulty was encountered in filtering the miscella prior to removal of the solvent.

The dried, substantially dust-free granulated material (meal) had an oil content of about 1.5%.

The weight per bushel determinations, herein described and utilized in the claims were made utilizing the method of making test weight per bushel determinations described in the Handbook of Official Grain Standards of the United States Agricultural Marketing Service, United States Department of Agriculture, 1941 revision, page 96.

The invention while particularly adaptable to the combination mechanical and solvent extraction of flax seed is also applicable for similar extraction of other high oil-content vegetable materials such as cottonseed, peanuts, copra, palm kernel, babassu nuts, sesame, walnuts and the like. All of these materials have an oil content exceeding 25%. Thus, flax seed contains 35% to 40% oil; cottonseed contains about 30% oil; peanuts, 45% to 50% oil; copra, 60% to 65%; palm kernel 45% to 55%; babassu nuts about 67%. The term "high oil-content" used in the present specification and claims is intended to cover such vegetable seed or nut materials containing more than 25% oil.

In carrying out the process utilizing such high-oil-content materials, the mechanical screw press is adjusted so as to reduce the oil content to 10% to 24%, preferably 12% to 20%, and so as to yield a soft, porous press cake. The resultant press cake is then granulated utilizing preferably a multiple-break system of corrugated roller mills and screeners, sifters, or other size classifying machines, the granule size so produced being within the limits of .012–.066 inch except for not more than 10% small granulated material less than .012 inch and a relatively small percentage not more than 5% of coarse material of a size in excess of .066 inch. A regulated small percentage of the small size granular material less than .012 inch may be fed back into the mass of granulated material going through the solvent extraction apparatus in an amount sufficient so as to regulate the drainage of the granulated material in the solvent extraction apparatus, thereby to control the drainage of the solvent.

In place of hexane there may be used any suitable solvent for the neutral oils and free fatty acids present in the original high oil-content starting material. Hexane gives good results when extracting linseed, sesame seed and babassu nuts but due to its physical properties gives somewhat less favorable results with palm kernel and copra.

As many apparently widely different embodiments of this invention may be made without departing from the spirit and scope thereof, it is to be understood that we do not limit ourselves to the specific embodiments herein except as defined by the appended claims.

What we claim is:

1. The method of recovering the oil from high oil-content vegetable seeds or nuts which comprises pressing said material to remove part of the oil from the original vegetable material and so as to produce a soft, porous press cake having an oil content in the range of about 10% to 24% oil content, granulating the resultant cake into particles about 85% of which are sufficiently small to pass through a screen having .066 inch openings and sufficiently large to be held by a screen having .012 inch openings, and thereafter solvent extracting oil from the granulated material.

2. The method of recovering the oil from high oil-content vegetable seeds or nuts which comprises pressing said material to remove part of the oil from the original vegetable material and so as to produce a soft, porous press cake having an oil content in the range of about 10% to 24% oil content, granulating the resultant cake into particles about 85% of which are sufficiently small to pass through a screen having .066 inch openings and sufficiently large to be held by a screen having .012 inch openings, solvent extracting oil from the granulated material, and removing the solvent from the resultant oil containing miscella and from the extracted granulated material.

3. The method of recovering the oil from high oil-content vegetable seeds or nuts which comprises pressing said material to remove part of the oil from the original vegetable material and so as to produce a soft, porous press cake having an oil content in the range of about 10% to 24%, granulating said cake into particles substantially all of which are sufficiently small to pass through a screen having .066 inch openings and sufficiently large to be held by a screen having .012 inch openings, there being not more than 10% by weight of small granular material below .012 inch, said granulated material having a weight of 20 to 40 pounds per bushel, and thereafter solvent extracting oil from the granulated material.

4. The process of claim 3 further characterized in that said small granulated material is separated and a regulated portion thereof is remixed with the larger size granules preceding solvent extraction to control the rate of solvent drainage through the mass of granules to the range of 2 to 30 gallons per minute per square foot of area per foot of depth of material.

5. The process of claim 3 further characterized in that said small granulated material is separated and a portion thereof is introduced with the raw seeds or nuts prior to pressing so as to be thus reincorporated into the press cake.

6. The method of producing linseed oil which comprises pressing flax seed to remove part of the oil from the flax seed and so as to produce a soft, porous press cake, having an oil content of 10% to 24%, granulating the resultant cake into particles about 85% of which are in the size range of .012 inch to .066 inch, and solvent extracting oil from the resultant granulated mass.

7. The method of producing linseed oil which comprises pressing flax seed to remove part of the oil from the flax seed and so as to produce a soft, porous press cake having an oil content of 10% to 24%, granulating the resultant cake into particles about 85% of which are in the size range of .012 inch to .066 inch, solvent extracting oil from the resultant granulated mass and removing the solvent from the resultant oil containing miscella and remaining residual entrained solvent from the solvent extracted granular mass.

8. The method of producing linseed oil which comprises mechanically screw pressing flax seed to remove part of the oil from the flax seed and so as to produce a soft, porous press cake having an oil content of 10% to 24%, granulating the resultant cake and classifying the granular material as to size so as to produce a granulated mass, said granulated mass having a weight of 30 to 40 pounds per bushel, and an oil content of 10% to 24% and a particle size in which about 85% of particles are in the size range of .012 inch to .066 inch, there being not substantially more than 10% by weight of small granular particles of a size below .012 inch, and not substantially more than 5% by weight of granular particles larger than .066 inch in size, and solvent extracting oil from the resultant granulated mass.

9. The method of producing linseed oil which comprises mechanically screw pressing flax seed to remove part of the oil from the flax seed and so as to produce a soft porous press cake having an oil content of 10% to 24%, granulating the resultant cake and classifying the resultant granulated product as to size so as to provide a granulated flax seed material having about 85% by weight of said granule particles of a size ranging from .017 inch to .054 inch and not more than ten percent by weight of small granules of a size less than .017 inch, and thereafter solvent extracting oil from the granulated mass.

10. The process of claim 9 further characterized in that the pressing and granulation operations are so regulated as to produce a granulated linseed material having a weight in the range of 30 to 40 pounds per bushel, and an oil content of 12% to 20%.

11. The method of producing linseed oil which comprises pressing flax seed to expel part of the oil thereof and produce a soft porous press cake having an oil content of 10-24%, granulating the resultant cake in successive stages, sifting the granulated cake to separate the material into size fractions, namely a middle fraction in which the granular size of the particles is in the range of .012 inch to .066 inch, a fraction of small granular material in which the particles are smaller than those of said middle fraction and a fraction in which the particles are larger than those of said middle fraction, only the latter fraction being subsequently granulated, and solvent extracting oil from said granulated material, wherein there is about 85% by weight of granular particles in the range of .012 inch to .066 inch.

12. A method of making substantially fat-free linseed meal which comprises pressing flax seed to produce a soft, porous press cake having an oil content of 10% to 24%, granulating the resultant cake and sifting it so as to produce a granulated mass having a weight of 30 to 40 pounds per bushel and in which substantially all of the particles are in the size range of .012 inch to .066 inch, there being not substantially more than 10% by weight of small size granulated particles of a size below .012 inch and not substantially more than 5% by weight of a size larger than .066 inch, solvent extracting oil from the resultant granulated mass, removing residual solvent from the granulated mass so as to produce a solvent-free, granulated meal.

EDWARD W. SCHMIDT.
WILLIAM F. WEBBER.

REFERENCES CITED

The following references are of record in the file of this patent:

UNITED STATES PATENTS

| Number | Name | Date |
|---|---|---|
| 1,076,997 | Riddle | Oct. 28, 1913 |
| 2,158,427 | Reichert | May 16, 1939 |
| 2,278,647 | Cyphers et al. | Apr. 7, 1942 |
| 2,377,975 | Singer et al. | June 12, 1945 |

FOREIGN PATENTS

| Number | Country | Date |
|---|---|---|
| 214,478 | Great Britain | Apr. 24, 1924 |